Nov. 14, 1961     G. H. CHAMBERS     3,008,425
GEAR PUMP SEAL
Filed June 13, 1960
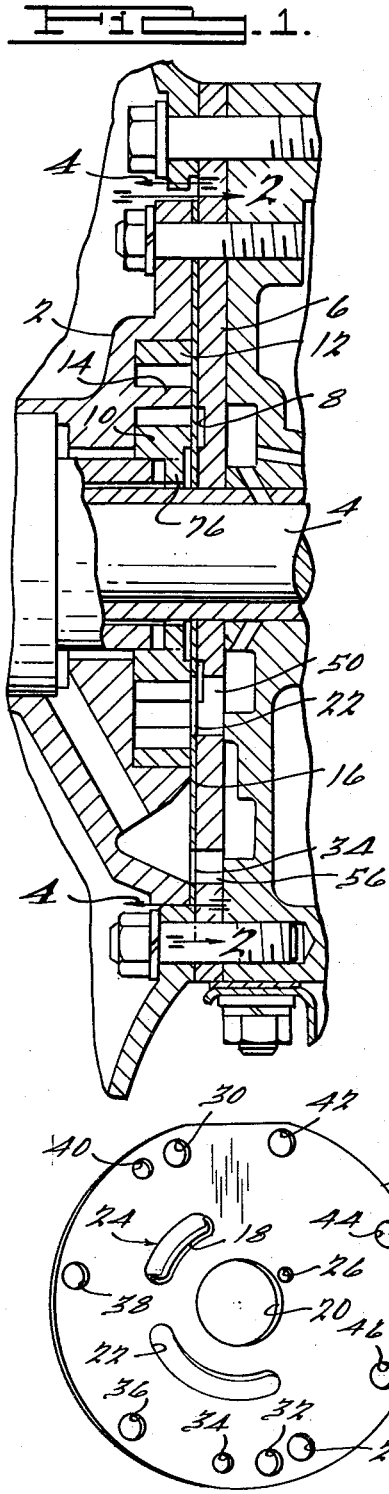
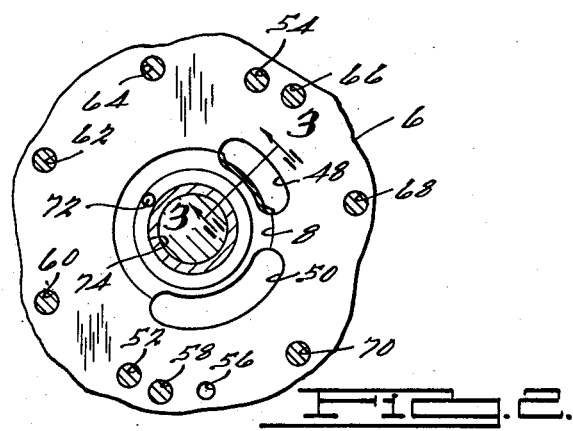
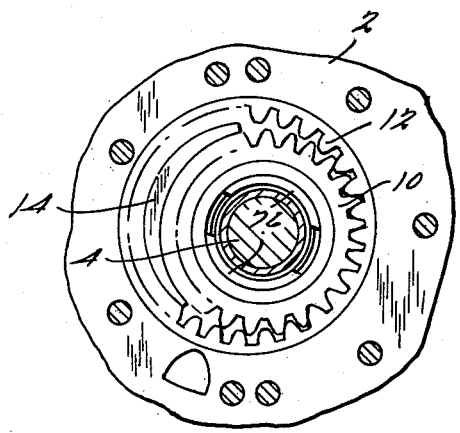
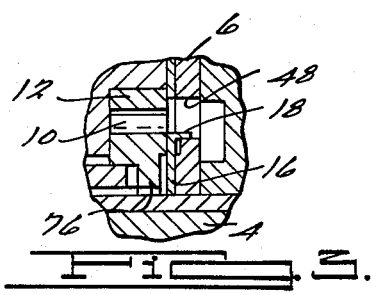
INVENTOR.
George H. Chambers
BY
Donald Diamond
ATTORNEY.

3,008,425
Patented Nov. 14, 1961

3,008,425
GEAR PUMP SEAL
George Harold Chambers, 1519 Belle Ave., Flint 6, Mich.
Filed June 13, 1960, Ser. No. 35,472
3 Claims. (Cl. 103—126)

This invention relates to gear pumps and, in a more specific aspect, to seals for such pumps.

The gear pump with which this invention is concerned generally comprises a pump housing and removably fastened thereto a pump cover. The pump cover is provided with a fluid inlet orifice and a fluid exit orifice. Rotatable gears, eccentrically positioned for imparting momentum to fluid passing through the pump, are disposed within the pump housing in juxtaposition to the pump cover and are rotatable in a plane substantially parallel to the plane of the pump cover. The rotatable gears consist of an inner gear having teeth along the outside circumference thereof and an outer gear of larger diameter having teeth along the inside circumference thereof for engaging the teeth of the inner gear. The pump is operated by a drive shaft which is provided with lugs for engaging grooves disposed within the inside circumference of the inner rotatable gear. During operation of the pump, the lugs become worn, causing the gears to rotate off-center. This off-center rotation of the gears permits the rotating gears to contact the pump cover and cut a channel between the fluid exit orifice and fluid inlet orifice. This channel is particularly undesirable because it permits fluid to flow therein, resulting in a significant reduction in the pressure output of the pump. When the above-described gear pump is employed as a front fluid pump in an automobile automatic transmission system, the reduction in the pressure output of the pump due to fluid flowing within the channel cut in the pump cover causes the clutch applied pressure and band applied pressure to be reduced with the consequent slippage of the transmission. Heretofore, in repairing a gear pump in which a channel has been cut in the pump cover, it has been necessary to completely replace the pump cover.

Therefore, an object of this invention is to provide an economical and simple way for repairing a gear pump in which a channel has been cut in the pump cover which does not require complete replacement of the pump cover.

Another object of this invention is to provide a gear pump sealing plate for sealing the channels cut within the pump cover whereby fluid is prohibited from flowing within said channels.

A further object of this invention is to provide a gear pump sealing plate having a laterally projecting flange for engaging the lower surface of the fluid exit orifice within the pump cover.

A still further object of this invention is to provide a gear pump sealing plate having on the face thereof, opposite the face from which said flange projects, a thrust-bearing surface.

In accordance with this invention there is provided a sealing member for a gear pump having a pump housing and removably fastened thereto a pump cover provided with a fluid inlet orifice and a fluid exit orifice wherein a channel has been cut in the pump cover due to the off-center rotation of the gears within said pump housing, comprising a sealing plate having a plurality of orifices corresponding substantially to the arrangement and configuration of orifices within the pump cover and adapted to be mounted intermediate the pump housing and the pump cover. The sealing plate is provided with a lateral flange for engaging the lower surface of the fluid exit orifice within the pump cover and optionally, but advantageously, is provided on the face, opposite the face from which the flange projects, with a thrust-bearing surface.

In the drawing:

FIG. 1 is a longitudinal section through a front fluid gear pump disposed within a Dynaflow automatic transmission system showing the gear pump sealing plate disposed intermediate to the pump housing and pump cover.

FIG. 2 is a section taken along line 2—2 of FIG. 1 showing the channel cut in the pump cover.

FIG. 3 is a section taken along line 3—3 of FIG. 2 showing the projecting flange from the sealing plate engaging the lower surface of the fluid exit orifice within the pump cover.

FIG. 4 is a section along line 4—4 of FIG. 1 showing the eccentric arrangement of the gears within the pump housing.

FIG. 5 is a front elevation of the sealing plate.

Referring more particularly to the drawing, a pump cover 6 is removably fastened to pump housing 2 by a plurality of bolts or other fastening means. The pump cover is provided with a fluid inlet orifice 50 and a fluid exit orifice 48. In addition, the pump cover is provided with a pair of dowel pin orifices 52 and 54 and a plurality of bolt holes 58, 60, 62, 64, 66, 68 and 70 as well as a converter oil orifice 72, oil return orifice 56 and drive shaft orifice 74.

Rotatable gears, eccentrically positioned for imparting momentum to fluid passing through the pump, are disposed within the pump housing 2 in juxtaposition to the pump cover 6 and are rotatable in a plane substantially parallel to the plane of the pump cover. The rotatable gears consist of an inner cylindrical gear 10 having teeth along the outside circumference thereof and an outer cylindrical gear 12 having teeth along the inside circumference thereof for meshing with the teeth of the inner gear. A crescent 14 is disposed within the pump housing intermediate the teeth of the inner and outer gears for a portion of the circumference thereof as is more particularly illustrated in FIG. 4.

The pump is operated by a drive shaft 4 which is provided with a pair of lugs or lateral projections, one of which is illustrated by reference numeral 76, for engaging grooves within the inside circumference of the inner rotatable gear 10. Rotation of the drive shaft produces rotation of the inner gear with the consequent rotation of the outer gear. During operation of the pump, the lugs become worn causing the gears, particularly the inner gear, to rotate off-center. As a consequence of this off-center rotation of the gears, the rotating gears, and particularly the inner gear, contact the pump cover during rotation and cut or grind a channel 8 therein as is shown in FIG. 2. Heretofore, in repairing a gear pump having a channel cut in the pump cover, it has been necessary to completely replace the pump cover.

In accordance with this invention, however, there is provided a gear pump sealing plate 16 which obviates the necessity for completely replacing the pump cover having a channel or groove cut therein. The sealing plate, of relatively thin cross-section and adapted to be disposed intermediate the pump housing 2 and pump cover 6, is provided with a plurality of orifices corresponding substantially to the arrangement and configuration of orifices within the pump cover. Thus, the sealing plate 16 has a fluid inlet orifice 22 and a fluid exit orifice 24. In addition, the sealing plate is provided with a pair of dowel pin orifices 28 and 30 and a plurality of bolt holes 32, 36, 38, 40, 42, 44 and 46 as well as converter oil orifice 26, oil return orifice 34 and drive shaft orifice 20. The sealing plate is provided with a laterally projecting flange 18 for engaging the lower surface of the fluid exit orifice 48 within pump cover 6 as is more particularly illustrated in FIG. 3. The face of the sealing plate 16, opposite the face from which the lateral flange 18 projects, is optionally, but advantageously, provided with a thrust-bearing surface made of bronze, copper or babbitt. Bronze is a copper/tin alloy and brass is a copper/zinc alloy. The sealing plate is easily and readily installed in a gear pump wherein a channel has been cut in the pump cover by removing the pump cover, fitting the plate into position by means of the dowel pins projecting from the pump housing and replacing the pump cover. The use of this sealing plate in a gear pump having a worn pump cover prohibits fluid from flowing within the channel cut in the cover and thereby enables the pump to substantially deliver its rated capacity.

Thus, the objects of this invention have been accomplished, namely, a gear pump sealing plate has been provided for sealing channels cut within the pump cover whereby fluid is prohibited from flowing within said channels as more particularly described herein.

I claim:

1. A gear pump comprising a pump housing and removably fastened thereto a pump cover, said pump cover having a fluid inlet orifice and a fluid exit orifice, said inlet orifice being of larger cross-sectional area than said exit orifice, first and second eccentrically positioned, cylindrical gears disposed within said pump housing in juxtaposition to said pump cover and rotatable in a plane substantially parallel to the plane of said pump cover, said first gear having teeth disposed along the outside circumference thereof and said second gear of larger diameter than said first gear having teeth disposed along the inside circumference thereof for engaging the teeth of said first gear, a drive shaft projecting through said pump having lugs thereon for engaging grooves disposed within the inside circumference of said first gear, means for rotating said drive shaft with the consequent rotation of said first and second gears, said gears rotating off-center and cutting a channel within said pump cover from said exit orifice to said inlet orifice whereby fluid is permitted to flow within said channel causing a reduction in the pressure output of said pump, a sealing plate, said sealing plate having a plurality of orifices corresponding substantially to the arrangement and configuration of orifices within said pump cover, a flange, said flange projecting laterally from said sealing plate beyond the outer surface thereof and constructed and arranged to engage the radially inner surface of the fluid exit orifice within said pump cover and to extend along the side walls of said exit orifice a sufficient distance to seal off said exit orifice from said channel, the face of said sealing plate, opposite the face from which said flange projects, being provided with a thrust-bearing surface, said sealing plate being disposed intermediate to said pump housing and said pump cover whereby fluid is prohibited from flowing within said channel.

2. A sealing member for a gear pump having a pump housing and removably fastened thereto a pump cover, said pump cover having a fluid inlet orifice and a fluid exit orifice, first and second eccentrically positioned, cylindrical gears disposed within said pump housing in juxtaposition to said pump cover and rotatable in a plane substantially parallel to the plane of said pump cover, said first gear having teeth disposed along the outside circumference thereof and said second gear of larger diameter than said first gear having the teeth disposed along the inside circumference thereof for engaging the teeth of said first gear, a drive shaft projecting through said pump having lugs thereon for engaging grooves disposed within the inside circumference of said first gear, means for rotating said drive shaft with the consequent rotation of said first and second gears, said gears rotating off-center and cutting a channel within said pump cover from said exit orifice to said inlet orifice whereby fluid is permitted to flow within said channel causing a reduction in the pressure output of said pump, comprising: a sealing plate, said sealing plate having a plurality of orifices adapted to correspond substantially to the arrangement and configuration of orifices within said pump cover, a flange, said flange projecting laterally from said sealing plate beyond the outer surface thereof and constructed and arranged to engage the radially inner surface of the fluid exit orifice within said pump cover and to extend along the side walls of said exit orifice for a sufficient distance to seal off said exit orifice from said channel, said sealing plate being adapted to be mounted intermediate to said pump housing and said pump cover.

3. A sealing plate in accordance with claim 2 wherein the face of said plate, opposite the face from which said flange projects, is provided with a thrust bearing surface.

References Cited in the file of this patent

UNITED STATES PATENTS

| | | |
|---|---|---|
| 2,694,367 | Seavey | Nov. 16, 1954 |
| 2,702,509 | Garnier | Feb. 22, 1955 |